United States Patent [19]
Yamamori et al.

[11] Patent Number: 4,918,147
[45] Date of Patent: Apr. 17, 1990

[54] PREPARATION OF METAL CONTAINING RESIN COMPOSITION AND ANTIFOULING PAINT CONTAINING SAID COMPOSITION

[75] Inventors: Naoki Yamamori; Masayuki Matsuda, both of Osaka; Kiyoaki Higo, Nara; Shinichi Ishikura, Kyoto, all of Japan

[73] Assignee: Nippon Paint Co., Ltd., Osaka, Japan

[21] Appl. No.: 194,286

[22] Filed: May 16, 1988

[51] Int. Cl.$^4$ .................... C08C 19/00; A61K 31/74; C09D 5/16
[52] U.S. Cl. .................... 525/386; 523/122; 424/78; 525/408
[58] Field of Search .................... 424/78; 523/122; 525/330.1, 386, 408

[56] References Cited
U.S. PATENT DOCUMENTS
4,774,080 9/1988 Yamamori et al. .................. 523/122

FOREIGN PATENT DOCUMENTS
5321224 2/1978 Japan .................... 525/330.1

Primary Examiner—Joseph L. Schofer
Assistant Examiner—Peter F. Kulkosky
Attorney, Agent, or Firm—Wenderoth, Lind & Ponack

[57] ABSTRACT

A resin composition to be used as a resinous vehicle for an antifouling paint and a process for preparing the same, comprising reacting a mixture of (A) an acid group containing base resin having an acid value in the range of 25–350 mg KOH/g, selected from the group consisting of vinyl resin, polyester resin, alkyd resin and epoxy resin, (B) a metallic salt of low boiling organic basic acid having a boiling point in the range of 100°–240° C., the metal is selected from metals having a valence of 2 or more and a lesser ionization tendency than alkali metals, and (C) an organic monobasic acid having a boiling point of 20° C. or more higher than said low boiling organic basic acid at an elevated temperature which is lower than the decomposition temperature of said metallic salt of said low boiling organic basic acid, while removing the formed low boiling organic basic acid out of the system. The subject composition provides superior antifouling coating compositions.

11 Claims, No Drawings

PREPARATION OF METAL CONTAINING RESIN COMPOSITION AND ANTIFOULING PAINT CONTAINING SAID COMPOSITION

FIELD OF INVENTION

The present invention relates to the preparation of a metal containing resin composition which is characterized by having a metal ester bond at the end portion of the pendant chain. The invention also concerns an antifouling paint containing as the resinous vehicle the thus formed metal containing resin composition.

BACKGROUND OF THE INVENTION

Today, it is a very common to apply onto the hull, of a ship and the like an antifouling coating composition comprising an organic or inorganic antifouling agent and a resinous binder such as vinyl resin, alkyd resin and the like.

With these, antifouling paints the antifouling effect is fully dependent on the antifouling agent being dissolved out of the coating, and the dissolution of said agent is primarily determined by the diffusion of the agent based upon the concentration gradient of said agent in the coating. As a result, one is unable to obtain a long lasting, stable antifouling effect using these paints.

Furthermore, since the water insoluble resinous component will, after dissolution of said agent from the coating, form a skeleton structure, there are additional disadvantages associated with these paints such as an increase in friction between the ship surface and water, a reduced speed, an increase in fuel consumption and the like. Under these circumstances, an antifouling coating composition comprising an antifouling agent and a hydrolyzable resin vehicle capable of forming a comparatively tough coating which is gradually decomposed by hydrolysis in sea water has become the focus of much research.

The present inventors have already found that a class of polyester resins having a number of metal-ester bonds in their polyester backbone chains are useful as a resinous vehicle in a polishing type antifouling paint, and these resins are the subjects of Japanese Patent Application Nos. 165922/81 and 196900/83.

Such resins have the nature of being easily hydrolyzed, under weak alkaline condition as in sea water at the metal-ester bonding portions, disintegrated into a number of small, low molecular weight segments and dissolved in sea water. However, said resins are primarily of comparatively low molecular weight (e.g. up-to about 2000) and are poor in film-forming property, and therefore, said coating compositions suffer from cracks and peeling of the formed coatings.

If the molecular weight of said polyester resin is increased to a moderate level, it is indeed possible to improve the film-forming property, but, at that time, it will necessarily have a marked decrease in the hydrolysis property of the resin. To compensate for this if the number of metal-ester bonds in the backbone chain of the resin is increased the resultant resin is only soluble in a polar solvent and not in most solvents commonly used in a coating composition, and the formed coating is swollen with sea water. These attempts would therefore, give no fruitful results, and thus, these resins are unsatisfactory for use in antifouling paints.

An attempt has also been made to use a resin whose side chain has a trialkyl tin ester portion as a terminal group. In this type of resin, polarity of the resin is gradually increased in proportion to the progress in hydrolysis of said ester portion, and the resin is finally dissolved in sea water.

Typical examples of such resins are acrylic resins having as a constituent element tri organo tin salts of α, β-unsaturated basic acids. In this case, in order to obtain a stabilized, tough coating, the resin should preferably be free from hydrophilic groups if circumstances allow, and in order to ensure the dissolution of the hydrolyzed resin in sea water, the resin should preferably have as many hydrophilic groups as possible, i.e. more than a certain critical range, after said hydrolysis.

Therefore, in the preparation of such resin by the copolymerization of tri organo tin salt of α, β-unsaturated basic acid and other acrylic vinyl monomers, attempts have been made such that the former is present in a higher concentration in the reaction system and the latter is selected from members with no or the least amount of hydrophilic groups. Thus, a copolymer of acrylate, acrylamide, styrene and the like containing 55 to 70 wt % of tri organo tin salt of α, β-unsaturated monobasic acid has been prepared and can be practically used.

In this type of resin, differing from the aforesaid polyester resin having metal-ester bonds in its main chain, hydrophilic carboxyl groups are generated at the time when the tri organo tin portions at the side chains are released through hydrolysis and the resin is only dissolved in sea water at the stage where the concentration of said carboxyl groups get to a certain critical point. The film-forming property of the resin is also excellent. However, this resin has the disadvantage that a considerable quantity of highly expensive and toxic organo tin compounds are essential. Therefore, from both an environmental and economic point of view, it has been long desired to reduce or eliminate the amount of such material.

In addition to the foregoing, the discoveries present inventors have also discovered (as disclosed in Japanese Patent Application No. 106434/85) a hydrolyzable resin composition which has an excellent film-forming property and whose resin is characterized by having at the side chain portions a particular group capable of resulting a hydrophilic group through hydrolysis, being hydrolyzed and dissolved in sea water at an appropriate rate, and being prepared without the necessity of using a tri organo tin compound which is expensive and toxic, the composition consisting essentially of a resin having at least one side chain bearing at least one terminal group of the formula:

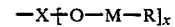

wherein X represents

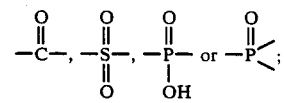

M is a metal selected from zinc, copper and tellurium; x is an integer of 1 to 2; R represents an organic acid residue selected from

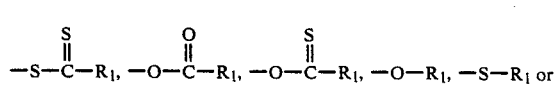

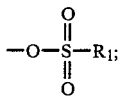

and $R_1$ is a monovalent organic residue.

Said resin composition is prepared by either one of the following methods.

(1) A mixture of (a) a metal oxide, hydroxide, sulfide or chloride, (b) a monovalent organic acid or its alkali metal salt, and (c) a polymerizable unsaturated organic acid or its alkali metal salt is heated under stirring at a temperature lower than the decomposition temperature of the desired metal ester product, and the by-produced substances as alkali metal chloride, water monovalent organic acid metal ester, bifunctional polymerizable unsaturated organic acid metal salt and the like are removed to obtain a purified metal ester between the polymerizable unsaturated organic acid and the monovalent organic acid.

The thus obtained metal ester between the polymerizable unsaturated organic acid and the monovalent organic acid or the mixture of said metal ester and the monovalent organic metal ester is then subjected to a homopolymerization or a copolymerization with other copolymerizable monomer(s) to give the desired resin having at least one side chain bearing at least one metal ester containing terminal group.

(2) A mixture of (d) a resin having at a side chain an organic acid or its alkali metal salt, (e) a metal oxide, hydroxide, sulfide or chloride, and (f) a monovalent organic acid is heated under stirring at a temperature lower than the decomposition temperature of the desired metal ester containing resin, and the by-product substances are removed, if desired, to obtain a resin having at least one side chain bearing the desired metal ester terminal group.

(3) Alternatively, the desired product may be prepared by reacting a resin having at a side chain an organic acid (g) and a monovalent organic acid metal ester (h) at a temperature of not higher than the decomposition temperature of the desired product, thereby effecting an ester exchange reaction between the materials used.

However, various unsolved questions are still remaining in these methods. That is, in the first method, the selected metal compound happens to exert a polymerization inhibiting activity requiring a quantity of initiator to be present in the reaction system to accelerate the reaction smoothly.

Furthermore, certain monomers are hardly soluble in a conventional reaction solvent and in such case, the reaction must be carried out under heterogeneous reaction conditions or in a considerable quantity of solvent, giving polymers with low molecular weights.

In the second method, since the reaction involved is a neutralization reaction, there is a considerable difficulty in the control of the reaction speed and in the extreme case, there occurs gelation of the reaction product.

And, in the third method, since the reaction involved is a kind of equilibrium reaction and no particular regard is given to removing the by-product monobasic acid out of the reaction system, such acid always remain in the product in the form of free acid and causes blisters in the coating when exposed to ionic atmosphere. Furthermore, such acid may be reacted with an antifouling agent in a coating composition under preparation and storage conditions, causing a remarkable decrease in the quality of the coating composition or the coating prepared therefrom. Free acid may also cause corrosion of the base plate.

It is, therefore, an object of the invention to provide a novel method for the preparation of a metal containing resin composition which is totally free from the abovesaid problems. An additional object of the invention is to provide a method in which a variety of metals may be freely used and such metal can be incorporated in a resin in various forms bonded with carboxylic acid, sulfonic acid and phosphoric acid.

A further object of the invention is to provide a method by which a high boiling organic basic acid can be introduced in side chains of a resin in metal ester form and in a higher reaction yield.

Yet another object of the invention is to provide an antifouling paint which is excellent in film-forming property, and capable of forming a coating without blistering and being excellent in polishing and antifouling effects.

SUMMARY OF THE INVENTION

According to the present invention, the aforesaid objects can be attained with a process for preparing a metal containing resin composition comprising reacting a mixture of (A) an acid group containing base resin, (B) a metallic salt of a low boiling organic basic acid in which the metal is selected from metals having a valence of 2 or more and a lesser ionization tendency than those of alkali metals, and (C) a high boiling organic monobasic acid at an elevated temperature while removing the formed low boiling organic basic acid out of the system, and an antifouling paint containing as a resinous vehicle the aforesaid resin composition.

PREFERRED EMBODIMENTS OF THE INVENTION

In the present invention, a base resin having acid groups a as carboxylic acid, sulfonic acid or phosphoric acid residue is reacted with a metallic salt of a low boiling organic basic acid and a high boiling organic monobasic acid at an elevated temperature and the by-product (through ester exchange reaction) low boiling organic basic acid is removed out of the system through, for example, thermal decomposition, vacuum distillation, azeotropic distillation with water or organic solvent and the like.

The reactions involved are all equilibrium reactions and they are, differing from a vigorous neutralization reaction, easily controlled. Furthermore, there is no fear of a quantity of undesired low boiling basic acid remaining in the reaction product and a larger quantity of initiator is not needed.

Therefore, the present method is very useful for the preparation of an hydrolysis type, metal containing resin composition for coating use.

Additional benefit resides in the fact that the high boiling organic acid can be easily and advantageously introduced into a base resin through metal ester bonding, which is hardly possible by the conventional ester exchange reaction between an acid group containing base resin and a metallic ester of an organic monobasic acid.

The base resin used in the present invention may be any of known, coating-use resin having acid groups at the side chains thereof. Examples are vinyl resin, polyester resin, alkyd resin, epoxy resin and the like.

The metallic salts of low boiling organic basic acids are metallic salts of organic carboxylic acids, organic sulfonic acids or organic phosphoric acids, each having a boiling point of 100° to 240° C. Said metallic component may be any metals having a valence of 2 or more and a lesser ionization tendency than those of alkali metals.

Examples are the members belonging to Ib (e.g. Cu, Ag), IIa (e.g. Ca, Ba), IIb (e.g. Zn, Cd, Hg), IIIa (e.g. Sc, Y), IIIb (e.g. Al, In), IVa (e.g. Ti, Zr), IVb (e.g. Sn, Pb, Si), Va (e.g. V, Nb), VIa (e.g. Cr, Mo, W), VIb (e.g. Se, Te), VIIa (e.g. Mn) and VIII (e.g. Fe, Co, Ni) groups of Periodic Table.

Though the metallic salts such may likewise be organo metal salts as dibutyl tin acetate, dioctyl tin acetate and the like, they must be of the polyorganic acid salt type.

In this invention, the term "low boiling" is used in contrast to the term "high boiling", although there is no definite limitation of the boiling range of the respective organic basic acid. However, in practice, the low boiling organic basic acid should preferably have a boiling point of 100° to 240° C.

In general, a metallic salt is liable to be decomposed by heating. Therefore, the reaction temperature must be in a range which is lower than the decomposition temperature of the metallic salt used.

For this reason, the low boiling organic basic acid should preferably be easily removed out of the system at a temperature which is lower than the decomposition temperature of the metallic salt and preferably 180° C. of more, either by method of thermal decomposition, vacuum distillation, azeotropic distillation with water or azeotropic distillation with an organic solvent.

Particularly preferable low boiling organic acids are acetic acid, propionic acid, oxalic acid, lactic acid, pivalic acid valeric acid, dimethyl acetic acid, enanthic acid, cychlohexane carboxylic acid, propionic acid, glycolic acid, acrylic acid, methacrylic acid and the like. Their corresponding sulfonic acids and phosphoric acids may likewise be used advantageously.

The metallic salts of low boiling organic basic acids may easily be prepared by the equimolar reaction of metal hydroxide or oxide and an organic basic acid, or the equimolar reaction of metallic sulfonate, nitrate or halide and an alkali metal salt of organic basic acid.

Various metallic salts of low boiling organic basic acids are available in the market, too.

As the high boiling organic monobasic acid, it should preferably have a far higher boiling point, at least 20° C. higher boiling point, than that of the low boiling organic acid. More preferably, it should have a bioactivity, such as fungicidal, antifouling and other similar activities.

They may be any organic acids including aliphatic, aromatic, alicyclic and heterocyclic organic acids.

Typical examples are benzoic acid, salicylic acid, 3,5-dichlorobenzoic acid, lauric acid, stearic acid, nitrobenzoic acid, linoleic acid, ricinoleic acid, 12-hydroxy stearic acid, fluoroacetic acid, pulvic acid, abietic acid, mercaptobenzothiazole, O-cresotinic acid, naphthol-1-carboxylic acid, p-phenyl benzene sulfonic acid, p-oxybenzoic acid, chloroacetic acid, dichloroacetic acid, naphthenic acid, β-naphthalene sulfonic acid, naphthol-1-sulfonic acid, 5-chloro-α,α-bis (3,5-dichloro-2-hydroxy phenyl) toluene sulfonic acid, p-phenyl benzoic acid, p-toluene sulfonic acid, p-benzene chlorosulfonic acid, dimethyl dithio carbamic acid, diethyl dithio carbamic acid, dibutyl dithio carbamic acid, lithocholic acid, phenoxy acetic acid, 2,4-dichlorophenoxy acetic acid, oleic acid, versatic acid, nicotinic acid, penicillic acid and the like. The reaction may be easily proceeded by merely mixing the materials and heating the mixture. At that time, it is however, necessary to continuously remove the formed low boiling organic basic acid out of the system by, for example, thermal decomposition, vacuum distillation, azeotropic distillation with water or an organic solvent and the like.

The inventors have also found that the reaction time can be markedly shortened when the reaction is carried out in the presence of 0.01 to 5% by weight, preferably 0.03 to 2% by weight of the resinous solid of an organic tin catalyst or an acid catalyst.

The thus obtained resin composition is stable and free from a detectable amount of low boiling organic basic acid which will cause blisters in the formed film or coating.

Since an amount of metal ester bond are included, the thus formed film or coating can be hydrolyzed under ionic atmosphere.

Therefore, the present resin composition may be used in various technical fields including paint, medicine and agricultural chemical industries, as a hydrolyzable, film-forming resin. Among these uses, particular preference is given to the resin's use as a resinous vehicle in an antifouling paint.

Thus, as a second aspect of the present invention, there is provided an antifouling paint containing as a resinous vehicle a metal containing resin composition prepared by the method of this invention.

In this particular application, since a hydrolysis rate of the resulted coating is very important, the acid group containing base resin should preferably have an acid value of 25 to 350 mg KOH/g. This is because, if the acid value is less than 25 mg KOH/g, the desired hydrolysis rate of the coating may not be fully attained due to deficient metal ester bondings, whereas if the acid value exceeds 350 mg KOH/g, there are adverse effects on film properties. As to the molecular weight of the present metal containing resin, there is no particular limit on it. However, when used as a resinous vehicle of an antifouling paint, the number average molecular weight of the resin should preferably be in a range of 4000 to 40,000, and more preferably 6000 to 35,000. This is because, if the molecular weight of the resin is less than 4000, there is an increase in the occurrence of cracks and peeling of the formed coating due to deficient film-forming properties, and if the molecular weight of the resin exceeds over 40000, there is a tendency that storage stability of the coating composition is lowered to an undesirable extent. Moreover, a larger amount of diluting solvent is required for coating purposes and this is neither economical nor environmentally desirable.

The present antifouling paint is characterized by containing as a resinous vehicle the abovementioned metal containing resin composition, however, this paint may further contain, as optional ingredients, the following.

(1) Antifouling agent:

Various known antifouling agents including antifouling agents for ship hull paint, bactericides, fungicides, agricultural chemicals or the like may be satisfactorily used a. However, when the solubility of such compound in sea water is less than 0.01 ppm, one is unable to get a good balance between the dissolution speed of the coating and dissolving power of the antifouling agent, and therefore, no effective antifouling can be expected with said compound. On the other hand, when the solubility of such a compound in sea water is over 5000 ppm, the formed coating will absorb water and the contained antifouling agent will selectively dissolve out and hence, one is unable to get a desired antifouling efficiency.

Therefore, the solubility of the antifouling agent in sea water should preferably be in a range of 0.01 to 5000 ppm, and more preferably 0.1 to 50 ppm.

Examples of such antifouling agents are in powder or flake form copper, zinc, manganese or the like; oxides, suboxides, rhodanides, carbamates, hydroxides or pyrithiones of copper, zinc, manganese and the like; benzothiazole compounds; phthalimide compounds; sulfamide compounds; sulfide compounds; quinoline compounds; phthalonitrile compounds; carbamate compounds; isothiazoline compounds; triphenyl tin compounds; carbamic acid compounds and esters; thiocyanate compounds and the like.

More specifically, they may be classified in the following groups from a sustained-release point of view.

(A) most preferable members:

copper powder, copper suboxide, copper rhodanide, zinc bis (dimethyl dithiocarbamate), zinc ethylene bis (dithiocarbamate), manganese ethylene bis (dithiocarbamate), copper bis (dimethyl dithiocarbamate), 2-thiocyanomethylthio benzothiazole, tetramethyl thiuram disulfide, 8-hydroxy quinoline, zinc pyrithione, N-(fluorodichlorothio) phthalimide, 2,4,5,6-tetrachloro-1,3-isophthalonitrile, 2,3,5,6-tetrachloro-4-(methylsulfonyl) pyridine, N,N-dimethyl-N'-phenyl-N'-(fluorodichlorothio) sulfamide, 3-jodo-2-propynyl butyl carbamate, 4,5-dichloro-2-n-octyl-4-isothiazoline-3-on and the like, (B) preferable members:

copper hydroxide, triphenyl tin hydroxide, triphenyl tin chloride, zinc powder, N-(trichloromethylthio)-phthalimide, N-(tetrachloroethylthio)-tetraphthalimide, N,N-dimethyl-N'-(fluorodichloromethylthio)-sulfamide, 2-benzimidazole carbamic acid methyl, benzyl isothiocyanate, N-n-octylisothiazolone, dimethyl dithiocarbamic bromide and the like.

(C) least preferable members:

bistriphenyl tin oxide, quinoline, triphenyl tin acetate, zinc hydroxide and the like.

At least one of the abovesaid antifouling agents may be advantageously used. Other antifouling agents may be used together, as desired.

Among them, copper powder is very useful when combined with another antifouling agent, because it produces a synergistic effect and provides a good storage stability.

When an antifouling agent is compounded with heretofore proposed triorgano tin salt of high molecular weight substance (known hydrolysis type resin), there are often reactions between the resin and the antifouling agent used. However, the present resinous vehicle is inert to these antifouling agents, and therefore, it is possible to get a stable coating composition and a reliable antifouling efficiency of the coating.

(2) Plasticizer and hydrolysis regulator:

As the plasticizer and hydrolysis regulator, any known compound having solubility in sea water of 0 to 1% by weight may be satisfactorily used.

This is because, if the solubility is over 1% by weight, the used plasticizer and hydrolysis regulator are selectively dissolved out of the coating into sea water and stable plasticizing and polishing effects can hardly be obtained. Examples of such plasticizers are phthalic acid esters as dioctyl phthalate, dimethyl phthalate, dicyclohexyl phthalate and the like, aliphatic dibasic acid esters as diisobutyl adipate, dibutyl sebacate and the like, glycol esters as diethylene glycol dibenzoate, pentaerythritol alkyl ester and the like, phosphoric acid esters as tricresyl phosphate, trichloroethyl phosphate and the like, epoxy type plasticizers as epoxy soyabean oil, epoxy octyl stearate and the like, organo tin plasticizers as dioctyl tin laurate, dibutyl tin laurate and the like, trioctyl trimellitate, camphor, triacetylene and the like.

(3) Hydrolysis regulator:

Examples of such hydrolysis regulators are chlorinated paraffin, polyvinyl ether, polypropylene sebacate, partially hydrogenated terphenyl, polyvinyl acetate, polyalkyl (meth) acrylate, polyether polyol, alkyd resin, polyester resin, polyvinyl chloride and the like.

(4) Pigment:

For example, body pigments as baryte, precipitated barium sulphate, talc, kaoline, chalk, silica white, alumina white, titanium white, bentonite and the like; color pigments as titanium deoxide, zirconium oxide, basic lead sulfate, tin oxide, carbon black, graphite, red iron oxide, chrome green, emerald green, phthalocyanine blue, and the like.

(5) Solvent:

For example, hydrocarbons (e.g. xylene, toluene, benzene, ethyl benzene, cyclopentane, octane, heptane, cyclohexane, white spirit and the like), ethers (e.g. dioxan, tetrahydrofuran, ethyleneglycol monomethyl ether, ethyleneglycol monoethyl ether, ethyleneglycol dimethyl ether, ethyleneglycol monobutyl ether, ethyleneglycol dibutyl ether, diethyleneglycol monomethyl ether, diethyleneglycol monoethyl ether and the like), esters (e.g. butyl acetate, propyl acetate, benzyl acetate, ethyleneglycol monomethyl ether acetate, ethyleneglycol monoethyl ether acetate and the like), ketones (e.g. methyl isobutyl ketone, ethyl isobutyl ketone and the like), alcohols (e.g. n-butanol, propyl alcohol and the like), and the like.

(6) Other additives:

For example, organic monobasic acids (e.g. rosin, monobutyl phthalate, monooctyl succinate and the like), camphor, castor oil and the like.

The present antifouling paint can be prepared by the method known per se in the art, by using ball-mil, pebble mil, roll mil, speed run mil and the like.

The present inventors have also found that by the inclusion of 0.01 to 5 wt % of amphoionic group containing compound as described in Japanese Patent Application Laid Open No. 151727/56 in the present coating composition (as exemplified in Examples 19 to 58), it is possible to shorten the dispersing time required for the formulation of said paint and improve the dispersion stability of the thus obtained paint. Since the vehicle resin contains metals whose ionization tendency is lower than those of alkali metals, as zinc, copper tellurium and the like in the form of metal esters, the coating or film obtained will be gradually hydrolyzed in an alkali atmosphere as in sea water, and disintegrated and dissolved or dissipated in said atmosphere.

Furthermore, differing from the known hydrolysis type polyester resin having metal ester bonds in the main chain, the present resin is characterized by having the metal ester bonds at the end portions of side chains.

Therefore, with the progress of hydrolysis of said side chains, the resin is gradually turned to a soluble type resin and finally dissolved in sea water. Thus, the solubilization mechanism involved totally differs from that of the known hydrolysis type polyester resin which is disintegrated to small pieces by hydrolysis. For this reason, the present antifouling paint could exhibit a longer effective life than the conventional one. Furthermore, since the present antifouling paint can be formulated without the necessity of relying on an expensive and toxic triorgano tin compound, the manufacturing cost can be markedly lowered and health and environmental problems can be effectively obviated.

The present paint is totally free from low boiling organic basic acid and therefore, there is no fear of forming blisters in the formed coating. Thus, the present antifouling paint is quite useful for the coating of various substrates such as ships, marine structures, fish nets and the like.

The invention shall be now more fully explained in the following Examples. Unless otherwise being stated, all parts and % are by weight.

PREPARATION OF BASE RESIN VARNISHES

REFERENCE EXAMPLE 1

Into a 4-necked flask fitted with a stirrer, a reflux condenser, a nitrogen gas inlet tube and a dropping funnel, were placed 100 parts of xylene and 20 parts of n-butanol and the mixture was heated to 100° to 110° C. To this, a mixture of 25.7 parts of acrylic acid, 57.8 parts of ethyl acrylate, 16.5 parts of methyl methacrylate and 3 parts of azobisisobutyronitrile was dropwise added in 4 hours. After completion of said addition, the combined mixture was maintained at 110° C. for 30 minutes, added dropwise with a mixture of 20 parts of xylene, 10 parts of n-butanol and 0.5 part of azobisisobutyronitrile in 1 hour and then maintained at the same temperature for 2 hours to obtain a resinous varnish (A) having a solid content of 39.6 wt % and a solid acid value of 200 mg KOH/g. The number average molecular weight (polystyrene conversion) of the resin contained was 11000.

REFERENCE EXAMPLE 2

Into a 4-necked flask fitted with a reflux condenser, a stirrer, a nitrogen gas inlet tube and a dropping funnel, were placed 90 parts of xylene and 20 parts of n-butanol and the mixture was heated to 100° to 110° C. To this, a mixture of 7.7 parts of methacrylic acid, 64.4 parts of methyl methacrylate, 28 parts of 2-ethyl hexyl acrylate and 2 parts of azobisisobutyronitrile was dropwise added in 4 hours. After completion of said addition, the mixture was heated at 110° C. for 30 minutes, added dropwise with a mixture of 30 parts of xylene, 10 parts of n-butanol and 0.5 part of azobisisobutyronitrile in 1 hour and then heated at the same temperature for 2 hours to obtain a resinous varnish (B) having a solid content of 39.8 wt% and a solid acid value of 50 mg KOH/g. The number average molecular weight of the resin contained was 15000.

REFERENCE EXAMPLE 3

Into a 4-necked flask fitted with a reflux condenser, a stirrer, a nitrogen gas inlet tube and a dropping funnel, were placed 100 parts of xylene and 20 parts of n-butanol and the mixture was heated to 100° to 110° C. To this, a mixture of 38.5 parts of acrylic acid, 50.9 parts of ethyl acrylate, 10.6 parts of n-butyl acrylate and 3 parts of azobisisobutyronitrile was dropwise added in 4 hours. After completion of said addition, the mixture was heated at 110° C. for 30 minutes, dropwise added with a mixture of 20 parts of xylene, 10 parts of n-butanol and 0.5 part of azobisisobutyronitrile in 1 hour and then heated at the same temperature for 2 hours to obtain a resinous varnish (C) having a solid content of 39.4 wt % and a solid acid value of 300 mg KOH/g. The number average molecular weight of the resin contained was 12000.

REFERENCE EXAMPLE 4

Into a 4-necked flask fitted with a reflux condenser, a stirrer, a nitrogen gas inlet tube and a dropping funnel, were place 80 parts of xylene and 20 parts of n-butanol and the mixture was heated to 80° to 90° C. To this, a mixture of 38.5 parts of acrylic acid, 45.8 parts of ethyl acrylate, 15.7 parts of methyl methacrylate and 1.5 parts of azobisisobutyronitrile was dropwise added in 4 hours. After completion of said addition, the mixture was heated at 90° C. for 30 minutes, dropwise added with a mixture of 40 parts of xylene, 10 parts of n-butanol and 0.5 part of azobisisobutyronitrile in 1 hour and then heated at the same temperature for 2 hours to obtain a resinous varnish (D) having a solid content of 39.8 wt % and a solid acid value of 300 mg KOH/g. The number average molecular weight of the resin contained was 37,000.

EXAMPLE 1

Into a 4-necked flask fitted with a reflux condenser, a stirrer, a nitrogen gas inlet tube and a decanter, were placed 100 parts of the resinous varnish (A) obtained in Reference Example 1, 25.9 parts of zinc acetate, 40.3 parts of oleic acid and 120 parts of xylene and the mixture was heated to 120° C. and maintained at the same temperature, while removing the formed acetic acid with said solvent. The end point of said reaction was settled by determining the quantities of acetic acid in the distillate and the reaction was stopped after elapsing 12 hours. Thus obtained varnish-1 had a solid content of 55.3 wt % and a viscosity of R-S.

EXAMPLE 2

Into a 4-necked flask fitted with a reflux condenser, a stirrer, a nitrogen gas inlet tube and a decanter, were placed 100 parts of the resinous varnish (C) obtained in Reference Example 3, 44 parts of copper propionate, 60 parts of naphthenic acid, 0.1 part of butane sulfonic acid and 20 parts of deionized water and the mixture was heated to 100° C. and maintained at the same temperature, while removing the formed propionic acid azeotropically with water. The end point of said reaction was determined by checking the amount of propionic acid in the distillate. The remaining amounts of water were completely removed, the reaction was stopped after 7 hours' reaction and xylene was then added to the reaction mixture. Thus obtained varnish-2 had a solid content of 52.3 wt % and a viscosity of P.

EXAMPLE 3

Into a 3-necked flask fitted with a reflux condenser, a stirrer and a decanter, were placed the resinous varnish (B) obtained in Reference Example 2, 8.1 parts of manganese acetate and 7.8 parts of 2,4-dichlorophenoxy acetate and the mixture was heated to 70° C. and maintained at the same temperature for 10 hours. The formed acetic acid was continuously removed under reduced pressure and, after completion of the reaction, 95 parts of xylene were added to obtain varnish-3 having a solid content of 56.3 wt % and a viscosity of U.

EXAMPLE 4

Into a similar reaction vessel as used in Example 1, were placed 100 parts of the resinous varnish (D) obtained in Reference Example 4, 37.2 parts of cobalt acetate, 32.1 parts of versatic acid and 120 parts of xylene and the mixture was heated and reacted while removing the formed acetic acid with the solvent for 12 hours. Thus obtained varnish-4 had a solid content of 56.2 wt % and a viscosity of Y.

EXAMPLE 5

The similar experiment as stated in Example 4 was repeated excepting substituting 65.1 parts of germanium acetate for 37.2 parts of cobalt acetate and 186 parts of versatic acid for 32.1 parts of versatic acid. Thus obtained varnish-5 had a solid content of 54.8 wt % and a viscosity of Z.

EXAMPLE 6

Into a 4-necked flask fitted with a reflux condenser, a stirrer, a nitrogen gas inlet tube and a decanter, were placed 100 parts of the resinous varnish (A) obtained in Reference Example 1, 22 parts of vanadium oxalate, 41.5 parts of naphthenic acid and 130 parts of xylene, and the mixture was heated to 120° C. and reacted at the same temperature while removing the formed oxalic acid with the solvent. Thus obtained varnish-6 had a solid content of 52.8 wt % and a viscosity of P.

EXAMPLE 7

Into a 4-necked flask fitted with a reflux condenser, a stirrer, a nitrogen gas inlet tube and a decanter, were placed 100 parts of the resinous varnish (A) obtained in Reference Example 1, 42.5 parts of zinc dl-lactate trihydrate, 28.6 parts of SA-13 (trademark of Idemitsu Sekiyu, branched type monocarboxylic acid, average carbon number 13) and 100 parts of xylene and the mixture was heated to 120° C. and reacted at the same temperature while removing the formed lactic acid with xylene. Thus obtained varnish-7 had a solid content of 54.2 wt % and a viscosity of Q.

EXAMPLE 8

Into a 4-necked flask fitted with a reflux condenser, a stirrer, a nitrogen gas inlet tube and a decanter, were placed 100 parts of the resinous varnish (A) obtained in Reference Example 1, 37 parts of nickel valerate, 22.6 parts of SA-9 (trademark of Idemitsu Sekiyu, branched type monocarboxylic acid, average carbon atoms 9), and 95 parts of xylene and the mixture was heated to 140° C. and reacted at the same temperature while removing the formed valeric acid with xylene. Thus obtained varnish-8 had a solid content of 55.1 wt % and a viscosity of O.

EXAMPLE 9

The same procedures as stated in Example 3 were repeated excepting substituting a mixture of 100 parts of the resinous varnish (C) obtained in Reference Example 3, 99.1 parts of lead enanthate and 62 parts of versatic acid for the materials shown in Example 3 and changing the reaction temperature to 140° C. Thus obtained varnish-9 had a solid content of 52.7 wt % and a viscosity of R.

EXAMPLE 10

Into a 4-necked flask fitted with a reflux condenser, a stirrer, a nitrogen gas inlet tube and a decanter, were placed 100 parts of the resinous varnish (B) obtained in Reference Example 2, 9.9 parts of magnesium cyclohexane carboxylate, 4.4 parts of nicotinic acid and 20 parts of deionized water and the mixture was reacted as in Example 2. Thus obtained varnish-10 had a solid content of 53.4 wt % and a viscosity of R.

EXAMPLE 11

Into a 4-necked flask fitted with a reflux condenser, a stirrer, a nitrogen gas inlet tube and a decanter, were place 100 parts of the resinous varnish (A) obtained in Reference Example 1, 39.9 parts of aluminium cyclopropane carboxylate, 72.4 parts of 2,4-dichlorophenoxy acetate and 125 parts of xylene and the mixture was heated to 140° C. and reacted as in Example 1, to obtain varnish-11 having a solid content of 51.8 wt % and a viscosity of V.

EXAMPLE 12

Into a 4-necked flask fitted with a reflux condenser, a stirrer, a nitrogen gas inlet tube and a decanter, were placed 100 parts of the resinous varnish (A) obtained in Reference Example 1, 34.7 parts of tellurium acetate, 40 parts of naphthenic acid, 0.2 part of butylene sulfonic acid and 110 parts of xylene and the mixture was reacted as in Example 1 for 8 hours to obtain varnish-12 having a solid content of 52.4 wt % and a viscosity of S.

EXAMPLE 13

Into a 4-necked flask fitted with a reflux condenser, a stirrer, a nitrogen gas inlet tube and a decanter, were placed 100 parts of the resinous varnish (B) obtained in Reference Example 2, 10.4 parts of dibutyl tin acetate, 7.1 parts of SA-13 and 115 parts of xylene and the mixture was reacted as in Example 1 to obtain varnish-13 having a solid content of 53.4 wt% and a viscosity of N.

EXAMPLE 14

Into a 4-necked flask fitted with a reflux condenser, a stirrer, a nitrogen gas inlet tube and a decanter, were placed 100 parts of the resinous varnish (A) obtained in Reference Example 1, 32.4 parts of chromium acetate, 80.7 parts of oleic acid and 130 parts of xylene and the mixture was reacted as in Example 1 to obtain varnish-14 having a solid content of 51.8 wt % and a viscosity of U.

EXAMPLE 15

Into a 4-necked flask fitted with a reflux condenser, a stirrer, a nitrogen gas inlet tube and a decanter, were placed 100 parts of the resinous varnish (D) obtained in Reference Example 4, 62.1 parts of dibutyl tin acetate, 62.1 parts of versatic acid and 150 parts of xylene and the mixture was reacted as in Example 1 to obtain varnish-15 having a solid content of 54.7 wt % and a viscosity of X.

EXAMPLE 16

Using the resinous varnish (B) obtained in Reference Example 2, 10 parts of titanium acetate, 18.2 parts of penicillic acid and 50 parts of xylene and the reaction temperature of 75° to 90° C., the similar experiment as stated in Example 3 was repeated to obtain varnish-16 having a solid content of 52.8 wt % and a viscosity of Y.

EXAMPLE 17

Into a 4-necked flask fitted with a reflux condenser, a stirrer, a nitrogen gas inlet tube and a decanter, were placed 100 parts of the resinous varnish (C) obtained in Reference Example 3, 59.9 parts of titanium acetate, 101 parts of 2,4-dichlorophenoxy acetate and 180 parts of xylene and the mixture was reacted as in Example 1 to obtain varnish-17 having a solid content of 56.2 wt % and a viscosity of Z.

EXAMPLE 18

Into a 4-necked flask fitted with a reflux condenser, a stirrer, a nitrogen gas inlet tube and a decanter, were placed 100 parts of the resinous varnish (D) obtained in Reference Example 4, 40 parts of copper acetate, 60 parts of naphthenic acid and 110 parts of xylene and the mixture was heated at 120° C. while removing the formed acetic acid with the solvent. Thus obtained varnish-18 had a solid content of 39.6 wt % and a viscosity of W.

COMPARATIVE EXAMPLE 1

The resinous varnish (C) obtained in Reference Example 3 was used as it is as Comparative varnish-1.

COMPARATIVE EXAMPLE 2

Into a 4-necked flask fitted with a reflux condenser, a stirrer, a nitrogen gas inlet tube and a dropping funnel, were placed 100 parts of xylene and 20 parts of n-butanol and the mixture was heated to 100° to 110° C. To this, a mixture of 30 parts of ethyl acrylate, 70 parts of methyl methacrylate and 2 parts of azobisisobutyronitrile was dropwise added in 4 hours. After completion of said addition and heating at 110° C. for 30 minutes, a mixture of 20 parts of xylene, 10 parts of n-butanol and 0.5 part of azobisisobutyronitrile was dropwise added in 1 hour and the combined mixture was heated at the same temperature for 2 hours to obtain Comparative varnish-2 having a solid content of 39.6 wt %.

COMPARATIVE EXAMPLE 3

Into a 4-necked flask fitted with a reflux condenser, a stirrer, a nitrogen gas inlet tube and a decanter, were placed 100 parts of the resinous varnish (A) obtained in Reference Example 1, 10.3 parts of zinc hydroxide, 60 parts of oleic acid and 110 parts of xylene and the mixture was heated at 100° to 120° C. while removing water with the solvent. Thus obtains varnish (Comparative varnish-3) had a solid content of 55.8% and a viscosity of $Z_2$.

COMPARATIVE EXAMPLE 4

Into a 3-necked flask fitted with a reflux condenser, a stirrer and a nitrogen gas inlet tube, were placed 100 parts of the resinous varnish (A) obtained in Reference Example 1 and 68 parts of zinc oleate, and the mixture was reacted at 120° C. for 3 hours. Thus obtained varnish (Comparative varnish-4) had a solid content of 62% and a viscosity of M to N.

COMPARATIVE EXAMPLE 5

Into a 4-necked flask fitted with a reflux condenser, a stirrer, a nitrogen gas inlet tube and a decanter, were placed 100 parts of the resinous varnish (A) obtained in Reference Example 1, 13 parts of zinc hydroxide and 105 parts of xylene and the mixture was heated at 120° C. During the reaction, certain amounts of water were distilled off, but after elapsing 30 minutes from the commencement of said reaction, the content was turned to gel and no uniform resinous solution was obtained.

COMPARATIVE EXAMPLE 6

Into a similar reaction vessel as used in Comparative Example 1, were placed 100 parts of the resinous varnish (D) obtained in Reference Example 4, 16.6 parts of copper hydroxide, 60 parts of naphthenic acid and 110 parts of xylene and the mixture was heated at 120° C. while removing water with the solvent. After elapsing 2 hours from the commencement of the reaction, the content was turned to gel and no uniform resinous solution was obtained.

EXAMPLE 19

45 parts of varnish-1 obtained in Example 1, 30 parts of cuprous oxide, 5 parts of zinc bis (dimethyl dithiocarbamate), 3 parts of colloidal silica, 5 parts of xylene, 10 parts of methyl isobutyl ketone and 2 parts of n-butanol were placed in a ball mill and the mixture was subjected to a dispersion operation for 5 hours to obtain a coating composition containing particles with maximum diameter of 35 μ.

EXAMPLES 20 TO 58 AND COMPARATIVE EXAMPLES 5 TO 9

Using the materials shown in Table 1 and following the method stated in Example 19, the respective coating composition was prepared.

TABLE 1

| Example | 20 | 21 | 22 | 23 | 24 | 25 | 26 | 27 | 28 | 29 | 30 | 31 | 32 |
|---|---|---|---|---|---|---|---|---|---|---|---|---|---|
| varnish 1 | 35 | 30 | | | | | | | | | | | |
| varnish 2 | | | 40 | 45 | | | | | | | | | |
| varnish 3 | | | | | 25 | | | | | | | | |
| varnish 4 | | | | | | 40 | | | | | | | |
| varnish 5 | | | | | | | 35 | | | | | | |
| varnish 6 | | | | | | | | 30 | | | | | |
| varnish 7 | | | | | | | | | 35 | | | | |
| varnish 8 | | | | | | | | | | 30 | | | |
| varnish 9 | | | | | | | | | | | 35 | | |
| varnish 10 | | | | | | | | | | | | 40 | 45 |
| Note 1 | 20 | | | 15 | | 15 | | 25 | | 30 | | 20 | |
| Note 2 | | 20 | | | 15 | | | | | | 30 | | |
| Note 3 | | | 25 | | | | | | 20 | | | | |
| Note 4 | | | | | | | 5 | | | | | | |
| Note 5 | | | | | | 3 | | | | | 5 | | |
| Note 6 | | 10 | | | | | 15 | | | | | | 10 |
| Note 7 | | | | 5 | | | | | | 10 | | 5 | |
| Note 8 | 10 | | | | | | | | | | | 5 | |

TABLE 1-continued

| | | | | | | | | | | | | | |
|---|---|---|---|---|---|---|---|---|---|---|---|---|---|
| Note 9 | | | | | 10 | | | | | | | | |
| Note 10 | | | | | | 5 | | | | | | | |
| Note 11 | | | | | | 10 | | | | | | | |
| Note 12 | | | | | 5 | | 5 | | | | 10 | 10 | 15 |
| Note 13 | | | | | | | | | | 10 | | | |
| Note 14 | | | 5 | | | | 5 | | | | | | |
| Note 15 | | | | | | 10 | | | | | | | |
| Note 16 | | 5 | | | 10 | | | | | | 5 | | |
| Note 17 | | | | | | | | | | 10 | 5 | | |
| Note 18 | | | 5 | | | | 5 | 5 | | | | | 10 |
| Note 19 | | 5 | | 5 | | | | 5 | 5 | | | | |
| Note 20 | | | | 5 | 5 | | | 5 | | | 5 | | |
| Note 21 | | | 5 | | | | | | 5 | | | | |
| Note 22 | | | | | 5 | | | | | | | 5 | |
| Note 23 | 5 | 5 | 5 | 2 | | | | 5 | 5 | | | | |
| Note 24 | 10 | | 5 | 5 | | 5 | 10 | | | 5 | | 5 | |
| Note 25 | 5 | 5 | 5 | 3 | | 5 | | 5 | | | | | |
| Note 26 | 3 | 3 | 3 | 3 | 3 | 3 | 3 | 3 | 3 | 3 | 3 | 3 | 3 |
| Note 27 | | 10 | | | | | | | 5 | | 5 | 5 | |
| Note 28 | 10 | 5 | | 5 | 20 | 10 | 10 | | 5 | 5 | | 10 | 10 |
| Note 29 | 2 | 2 | 2 | 2 | 2 | 4 | 2 | 2 | 2 | 2 | 2 | 2 | 2 |
| total | 100 | 100 | 100 | 100 | 100 | 100 | 100 | 100 | 100 | 100 | 100 | 100 | 100 |

| Example | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|
| varnish 1 | 35 | 40 | | | | | | | | | | | | | | | | | |
| varnish 2 | | | 35 | 40 | | | | | | | | | | | | | | 10 | 5 |
| varnish 3 | | | | | 35 | 40 | | | | | | | | | | | | | |
| varnish 9 | | | | | | | 40 | | | | | | | | | | | | |
| varnish 10 | | | | | | | | 35 | | | | | | | | | | | |
| varnish 11 | | | | | | | | | 40 | | | | | | | | | | |
| varnish 12 | | | | | | | | | | 35 | | | | | | | | | |
| varnish 13 | | | | | | | | | | | 35 | | | | | | | | |
| varnish 14 | | | | | | | | | | | | 40 | | | | | | | |
| varnish 15 | | | | | | | | | | | | | 40 | | | | | | |
| varnish 16 | | | | | | | | | | | | | | 45 | | | | | |
| varnish 17 | | | | | | | | | | | | | | | 40 | | | | |
| varnish 18 | | | 10 | | | | | | | | | | | | | 45 | 40 | 30 | 35 |
| Note 1' | 25 | | | 10 | 15 | | 5 | | | 15 | | 15 | | | | 25 | 20 | | |
| Note 2' | | | 25 | | | | | | 15 | | 5 | | 15 | 20 | | | | | 25 |
| Note 3' | | 30 | | 15 | | 10 | 10 | | | | 10 | | | | | | 5 | | |
| Note 4' | | | 25 | | | 15 | | 15 | | | | | | | | | | | |
| Note 5' | | | 10 | | | | | | | | | | | | | | | | |
| Note 6' | | 15 | | | | 5 | | | | | | | | | | | | | |
| Note 7' | | | | | | | 10 | | | | | | 15 | | | | | | |
| Note 8' | | | | | 10 | | | 10 | | | | | | 10 | | | | | |
| Note 9' | 10 | | 10 | | 5 | | | | | | | | | | | | 5 | | |
| Note 10' | | | | | | | | | 5 | | | | | | | | | | |
| Note 11' | | | | | | | | | | 10 | | | | | 10 | 10 | | | |
| Note 12' | | | | | 5 | | | | | | 10 | | | | | | 5 | | |
| Note 13' | | | | | | | | | | | | | | | | | 10 | | |
| Note 14' | | | | | | | | | 5 | | | | | | | | | | 10 |
| Note 15' | | | | | | | | | | | 5 | 5 | | | | | | | |
| Note 16' | | | | | 5 | | | | | | | | | 10 | | | | | |
| Note 17' | | 5 | | | | | | | | | 10 | 15 | | | | | | | |
| Note 18' | | | | | | 10 | | | | | | | | | | | | | |
| Note 19' | | 5 | | | | | | 5 | | | 5 | | | | | | | | |
| Note 20' | | | 5 | 5 | 10 | 10 | | 10 | 10 | 10 | 10 | 10 | 15 | 10 | 10 | 10 | | | 10 |
| Note 21' | 5 | | | | | 5 | 10 | 5 | | 5 | | | | | | | 15 | | |
| Note 22' | | | 5 | 5 | 5 | | | 10 | 5 | 5 | 5 | | 5 | | 5 | 5 | | 5 | |
| Note 23' | 10 | 5 | | 10 | | 5 | 5 | 5 | 5 | 10 | | | 5 | | 5 | 5 | | | 5 |
| Note 24' | 3 | 3 | 3 | 3 | 3 | 3 | 3 | 3 | 3 | 3 | 3 | 3 | 3 | | 3 | 3 | 3 | 3 | 3 |
| Note 25' | 10 | | | | 5 | | 10 | 10 | 10 | 5 | | 15 | 10 | 5 | | | 5 | | |
| Note 26' | 2 | 2 | 2 | 2 | 2 | 2 | 2 | 2 | 2 | 2 | 2 | 2 | 2 | | 2 | 2 | 2 | 2 | 2 |
| total | 100 | 100 | 100 | 100 | 100 | 100 | 100 | 100 | 100 | 100 | 100 | 100 | 100 | 100 | 100 | 100 | 100 | 100 | 100 |

| Example | 52 | 53 | 54 | 55 | 56 | 57 | 58 |
|---|---|---|---|---|---|---|---|
| varnish 1 | 35 | 35 | | | | | |
| varnish 2 | | | 45 | 40 | | | |
| varnish 3 | | | | | 35 | 35 | |
| varnish 4 | | | | | | | 40 |
| varnish 15 | | | | | | | |
| varnish 16 | | | | | | | |
| varnish 17 | | | | | | | |
| varnish 18 | | | | | | | |
| Note 1" | 5 | | | | | 10 | |
| Nots 2" | | 10 | | | | | |
| Note 3" | | | 5 | 10 | | | |
| Note 4" | | 5 | | | | | 10 |
| Note 5" | 10 | 10 | | | | 5 | |
| Note 6" | | 5 | | | | | |
| Note 7" | | | 10 | 15 | | 15 | |
| Note 8" | 15 | | | | 15 | | 25 |

TABLE 1-continued

| | 1 | 2 | 3 | 4 | 5 | 6 | 7 |
|---|---|---|---|---|---|---|---|
| Note 9" | | 5 | | | | | |
| Note 10" | 5 | | | | | | |
| Note 11" | | | 5 | | | | |
| Note 12" | | | | | 10 | | |
| Note 13" | | | 5 | | | | |
| Note 14" | | | | 10 | | | |
| Note 15" | | 5 | | | | | |
| Note 16" | 5 | | | | | | |
| Note 17" | | 5 | | | | | |
| Note 18" | | | | 10 | | | 10 |
| Note 19" | | | | 5 | | | |
| Note 20" | 5 | | | | | | |
| Note 21" | 5 | 10 | 5 | 5 | | 5 | 10 |
| Note 22" | 5 | 5 | 5 | 10 | 5 | 5 | |
| Note 23" | 3 | 3 | 3 | 3 | 3 | 3 | 3 |
| Note 24" | | 10 | 5 | 10 | 15 | 10 | |
| Note 25" | 5 | | | 10 | | | |
| Note 26" | 2 | 2 | 2 | 2 | 2 | 2 | 2 |
| total | 100 | 100 | 100 | 100 | 100 | 100 | 100 |

| | Comparative Example | | | | |
|---|---|---|---|---|---|
| | 7 | 8 | 9 | 10 | 11 |
| Comparative varnish 1 | 45 | | | | |
| Comparative varnish 2 | | 45 | | | |
| Comparative varnish 3 | | | 23 | | |
| Comparative varnish 4 | | | | 45 | |
| varnish 1 | | | | | 35 |
| cuprous oxide | 30 | 30 | 15 | 30 | |
| Zn bis (dimethyl dithiocarbamate) | 5 | 5 | 2 | 5 | |
| copper sulfate | | | | | 25 |
| dioctyl phthalate | | | | | 5 |
| titanium oxide | | | | | 5 |
| talc | | | | | 5 |
| xylene | 5 | 5 | 46 | 5 | 10 |
| colloidal silica | 3 | 3 | 2 | 3 | 3 |
| red iron oxide | | | | | 5 |
| methyl isobutyl ketone | 10 | 10 | 10 | 10 | 5 |
| n-butanol | 2 | 2 | 2 | 2 | 2 |
| total | 100 | 100 | 100 | 100 | 100 |

In Comparative Example 7, paint viscosity was very high, and therefore, a larger quantity of xylene was used.
Note 1: cuprous oxide
Note 2: zinc white
Note 3: copper rhodanide
Note 4: Cu powder
Note 5: Zn powder
Note 6: copper hydroxide
Note 7: 2-thiocyanomethylthio benzothiazole
Note 8: N-(fluorodichloromethylthio) phthalimide
Note 9: N-(trichloromethylthio) phthalimide
Note 10: N-(tetrachloroethylthio) tetraphthalimide
Note 11: benzyl isothiocyanate
Note 12: quinoline
Note 13: 8-hydroquinoline
Note 14: zinc pyrithione
Note 15: triphenyl tin acetate
Note 16: bis-triphenyl tin oxide
Note 17: 3-Jod-2-propynyl butyl carbamate
Note 18: tricresyl phosphate
Note 19: polyvinyl ether
Note 20: chlorinated paraffin wax,
Note 21: polyether polyol
Note 22: dioctyl phthalate
Note 23: talc
Note 24: titanium oxide
Note 25: red iron oxide
Note 26: colloidal silica
Note 27: methyl isobutyl ketone
Note 28: xylene
Note 29: n-butanol
Note 1': cuprous oxide
Note 2': copper rhodanide
Note 3': zinc white
Note 4': copper hydroxide
Note 5': N,N-dimethyl-N'-(fluorodicyclomethylthio) sulfamide
Note 6': 2-benzimidazole carbamic methyl
Note 7': benzyl isothiocyanate
Note 8': N-n-octyl-isothiazolone
Note 9': N,N-dimethyl-N'-phenyl-N'-(fluorodicyclomethylthio) sulfamide
Note 10': Zn bis (dimethyl dithiocarbamate)
Note 11': Zn ethylene bis (dithiocarbamate)
Note 12': Mn ethylene bis (dithiocarbamate)
Note 13': Cu bis (dimethyl dithiocarbamate)

TABLE 1-continued

Note 14': 2,4,5,6-tetrachloro-1,3-isophthalonitrile
Note 15': 2,3,5,6-tetrachloro-4-(methyl sulfonyl) pyridine
Note 16': 4,5-dichloro-2-n-octyl-4-isothiazolin-3-on
Note 17': dimethyl dithiocarbamic acid bromide
Note 18': triphenyl tin hydroxide
Note 19': triphenyl tin chloride
Note 20': chlorinated paraffin wax
Note 21': dioctyl phthalate
Note 22': titanium oxide
Note 23': red iron oxide
Note 24': colloidal silica
Note 25': xylene
Note 26': n-butanol
Note 1": chlorinated polyethylene
Note 2": chlorinated polypropylene
Note 3": triamyl citrate
Note 4": isobutyl tartarate
Note 5": polyether polyol
Note 6": copper naphthenate
Note 7": cuprous oxide
Note 8": zinc white
Note 9": 2,4-(thiazolyl) benzoimidazole
Note 10": 5-ethoxy-3-trichloromethyl-1,2,4-thiadiazole
Note 11": phenothiazole
Note 12": α-nitrostyrene sulfathiazole
Note 13": nitro acridine
Note 14": sulfathiazole
Note 15": tetraphenyl boron pyridinium
Note 16": thiabendazole
Note 17": N-(1,1,2,2-tetrachloroethylthio)-cyclohexene-1,2- dicarboxyimide
Note 18": α-chloro-α-phenyl acetyl urea
Note 19": 2-methyl carboxy-amino-benzimidazole
Note 20": talc
Note 21": titanium oxide
Note 22": red iron oxide
Note 23": colloidal silica
Note 24": xylene
Note 25": methyl isobutyl ketone
Note 26": n-butanol The coating compositions obtained in Examples 19 to 58 and Comparative Examples 5 to 9 each was applied onto a test plate in about 200 μ dry thickness, and thus prepared test plate was attached to Discrotor, immersed in sea water (16° to 23° C.) and rotated at a constant speed (peripheral speed about 30 knots) for 3 months (days and nights). Use-up rate of the coating was determined microscopically. The results are shown in Table 2.

TABLE 2

| Example | initial film thickness (μ) | Coating use-up rate film thickness after 3 months (μ) | used up film thickness (μ) |
|---|---|---|---|
| 19 | 190 | 160 | 30 |
| 20 | 210 | 185 | 25 |
| 21 | 190 | 155 | 35 |
| 22 | 190 | 135 | 45 |
| 23 | 200 | 160 | 40 |
| 24 | 200 | 185 | 15 |
| 25 | 185 | 160 | 25 |
| 26 | 210 | 180 | 30 |
| 27 | 170 | 150 | 20 |
| 28 | 190 | 160 | 30 |
| 29 | 180 | 150 | 30 |
| 30 | 190 | 155 | 35 |
| 31 | 180 | 170 | 10 |
| 32 | 190 | 175 | 15 |
| 33 | 190 | 160 | 30 |
| 34 | 185 | 150 | 35 |
| 35 | 200 | 160 | 40 |
| 36 | 200 | 165 | 35 |
| 37 | 210 | 190 | 20 |
| 38 | 185 | 170 | 15 |
| 39 | 190 | 150 | 40 |
| 40 | 205 | 195 | 10 |
| 41 | 195 | 180 | 15 |
| 42 | 185 | 165 | 20 |
| 43 | 205 | 190 | 15 |
| 44 | 210 | 185 | 25 |
| 45 | 190 | 160 | 30 |
| 46 | 210 | 195 | 15 |
| 47 | 195 | 170 | 25 |
| 48 | 210 | 180 | 30 |
| 49 | 205 | 180 | 25 |
| 50 | 200 | 170 | 30 |
| 51 | 195 | 160 | 35 |
| 52 | 195 | 160 | 35 |
| 53 | 200 | 170 | 30 |
| 54 | 190 | 155 | 35 |
| 55 | 170 | 130 | 40 |
| 56 | 205 | 190 | 15 |
| 57 | 205 | 185 | 20 |
| 58 | 190 | 65 | 25 |
| Comp. Ex. | | | |
| 7 | 200 | 0 | 200 |
| 8 | 190 | 190 | 0 |
| 9 | 170 | 135 | 35 |
| 10 | 190 | 135 | 55 |
| 11 | 165 | 95 | 70 |

Next, the respective coating composition was applied twice by brushing onto a sand-blasted steel plate previously coated with an anti-corrosive paint, so as to give a coating of 100 μ dry thickness each time. Thus prepared test plate was immersed in sea water for a defined period of time and the antifouling effect was examined. These tests were conducted at Aioi Bay, Hyogo Pref. The results are shown in Table 3.

TABLE 3

Antifouling test
(surface area % adhered with submarine living)

| Duration (months) | Example 19 | 20 | 21 | 22 | 23 | 24 | 25 | 26 | 27 | 28 | 29 | 30 | 31 |
|---|---|---|---|---|---|---|---|---|---|---|---|---|---|
| 2 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 |
| 26 | 0 | 5 | 0 | 0 | 0 | 5 | 0 | 0 | 0 | 0 | 0 | 5 | 0 |
| 28 | 0 | 15 | 0 | 0 | 5 | 10 | 0 | 5 | 0 | 0 | 0 | 15 | 0 |
| 30 | 3 | 20 | 0 | 5 | 10 | 15 | 10 | 15 | 0 | 0 | 0 | 20 | 0 |

| Duration (months) | Example 32 | 33 | 34 | 35 | 36 | 37 | 38 | 39 | 40 | 41 | 42 | 43 | 44 |
|---|---|---|---|---|---|---|---|---|---|---|---|---|---|
| 2 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 |
| 26 | 5 | 0 | 0 | 0 | 0 | 0 | 0 | 0 | 0 | 0 | 0 | 0 | 0 |
| 28 | 15 | 0 | 5 | 0 | 0 | 0 | 0 | 3 | 0 | 0 | 0 | 0 | 0 |
| 30 | 20 | 0 | 15 | 10 | 0 | 3 | 0 | 10 | 10 | 5 | 0 | 0 | 3 |

| Duration (months) | Example 45 | 46 | 47 | 48 | 49 | 50 | 51 | 52 | 53 | 54 | 55 | 56 | 57 | 58 |
|---|---|---|---|---|---|---|---|---|---|---|---|---|---|---|
| 2 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 | 0 |
| 26 | 0 | 0 | 0 | 0 | 0 | 0 | 0 | * | * | * | * | * | * | * |
| 28 | 0 | 0 | 0 | 0 | 0 | 0 | 0 | * | * | * | * | * | * | * |
| 30 | 0 | 10 | 3 | 5 | 0 | 0 | 0 | * | * | * | * | * | * | * |

| Duration (months) | Comparative Example 7 | 8 | 9 | 10 | 11 |
|---|---|---|---|---|---|
| 2 | 0 | 0 | 0 | 0 | 0 |
| 4 | 0 | 30 | 0 | 0 | 0 |
| 6 | 100 | 80 | 0 | 0 | 0 |
| 6 | 100 | 100 | 0 | 0 | 0 |
| 10 | 100 | 100 | 0 | 0 | 0 |
| 12 | stopped | 100 | 10 | 5 | 0 |
| 14 | | stopped | 30 | 20 | 0 |
| 16 | | | 100 | 70 | 30 |
| 18 | | | 100 | 100 | 100 |
| 20 | | | 100 | 100 | 100 |

*unexamined

Visual examination of surface conditions:
After conducting the aforesaid immersion test, the coated plate was examined by naked eyes on the surface conditions. No blisters and cracks were found on the coated plates of Examples 19 to 58. In Comparative Example 7, cracks were observed after 12 months' immersion test and in Comparative Example 8, blisters were observed after 10 months' immersion test.

The present invention thus provides a novel process for the preparation of a metal containing, hydrolysis type resin composition which is very useful as a resinous vehicle for an antifouling paint having excellent binder function and well-balanced dissolution properties. This process is quite suitable for the production of such resin compositions with a variety of metal sources in comparatively higher yields. The present resin composition can be freely compounded with a variety of antifouling agents and the thus obtained antifouling paints are characterized by forming coatings which are free from blisters and iron corrosion and give excellent, long-lasting antifouling effects.

What is claimed is:

1. A process for preparing a metal containing film-forming resin composition having a number average molecular weight of 4,000 to 40,000 which comprises reacting a mixture of
    (A) an acid group containing base resin having an acid value in the range of 25~350 mg KOH/g selected from the group consisting of vinyl resin, polyester resin, alkyd resin and epoxy resin,
    (B) a metallic salt of a low boiling organic basic acid having a boiling point in the range of 100°~240° C., the metal having a valence of 2 or more and a lesser ionization tendency than alkali metals, and
    (C) a high boiling organic monobasic acid having a boiling point which is 20° C. or more higher than that of said low boiling organic basic acid,
at an elevated temperature which is lower than the decomposition temperature of said metallic salt of said low boiling organic basic acid, while removing the low boiling organic basic acid out of the system said resin composition having a lower viscosity and better crack resistance as compared to a resin composition containing either the component (B) or (C).

2. A process according to claim 1, wherein the metal is selected from the elements belonging to Rows Ib, IIa, IIb, IIIa, IIIb, IVa, IVb, Va, VIa, VIb, VIIa and VIII of the Periodic Table.

3. A process according to claim 2, wherein the metal is selected from zinc, copper and tellurium.

4. A process according to claim 1, wherein the high boiling organic monobasic acid has an antifouling property.

5. A process according to claim 1, wherein the reaction is carried out in the presence of water, while removing the low boiling organic basic acid azeotropically with said water.

6. A process according to claim 1, wherein the low boiling organic basic acid is removed under reduced pressure.

7. A process according to claim 1, wherein the reaction is carried out in the presence of an organic solvent and the low boiling organic basic acid is removed out of the system azeotropically with said organic solvent.

8. An antifouling paint comprising a metal containing film-forming resin composition having a number average molecular weight of 4,000 to 40,000, said metal containing resin composition being prepared by reacting a mixture of
    (A) an acid group containing base resin having an acid value in the range of 25~350 mg KOH/g selected from the group consisting of vinyl resin, polyester resin, alkyd resin and epoxy resin, (B) a metallic salt of a low boiling organic basic acid having a boiling point in the range of 100°~240° C., the metal having a valence of 2 or more and a lesser ionization tendency than alkali metals, and (C) a high boiling organic monobasic acid having a boiling point which is 20° C. or more higher than that of said low boiling organic basic acid and having an antifouling property, at an elevated temperature which is lower than the decomposition temperature of said metallic salt of said low boiling organic basic acid, while removing the low boiling organic basic acid out of the system said resin composition having a lower viscosity and better crack resistance as compared to a resin composition containing either the component (B) or (C).

9. An antifouling paint according to claim 8, wherein the metal is selected from the elements belonging to Rows Ib, IIa, IIb, IIIa, IIIb, IVa, IVb, Va, VIa, VIb, VIIa and VIII of the Periodic Table.

10. An antifouling paint according to claim 9, wherein the metal is selected from zinc, copper and tellurium.

11. An antifouling paint comprising a metal containing film-forming resin composition having a number average molecular weight of 4,000 to 40,000, said metal containing film-forming resin composition being prepared by reacting a mixture of (A) an acid group containing base resin having an acid value in the range of 25~350 mg KOH/g selected from the group consisting of vinyl resin, polyester resin, alkyd resin and epoxy resin, (B) a metallic salt of a low boiling organic basic acid having a boiling point in the range of 100°~240° C., the metal having a valence of 2 or more and a lesser ionization tendency than alkali metals, and (C) a high boiling organic monobasic acid having a boiling point which is 20° C. or more higher than that of said low boiling organic basic acid, at an elevated temperature which is lower than the decomposition temperature of said metallic salt of said low boiling organic basic acid, while removing the low boiling organic basic acid out of the system, and an antifouling agent whose solubility in sea water is in the range of 0.01 to 5,000 ppm said resin composition having a lower viscosity and better crack resistance as compared to a resin composition containing either the component (B) or (C).

* * * * *